(12) United States Patent
Barringer

(10) Patent No.: US 10,278,553 B2
(45) Date of Patent: May 7, 2019

(54) POTTY-TRAINING SYSTEMS AND METHODS

(71) Applicant: William Barringer, Raleigh, NC (US)

(72) Inventor: William Barringer, Raleigh, NC (US)

( * ) Notice: Subject to any disclaimer, the term of this patent is extended or adjusted under 35 U.S.C. 154(b) by 358 days.

(21) Appl. No.: 15/071,958

(22) Filed: Mar. 16, 2016

(65) Prior Publication Data

US 2016/0275812 A1    Sep. 22, 2016

Related U.S. Application Data

(60) Provisional application No. 62/134,863, filed on Mar. 18, 2015.

(51) Int. Cl.
*A47K 17/00* (2006.01)
*G09B 19/00* (2006.01)

(52) U.S. Cl.
CPC .......... *A47K 17/00* (2013.01); *G09B 19/0076* (2013.01)

(58) Field of Classification Search
CPC ............................ G09B 19/0076; A47K 17/00
USPC ......................................................... 434/258
See application file for complete search history.

(56) References Cited

U.S. PATENT DOCUMENTS

| 4,491,991 A * | 1/1985 | Herbruck | A47K 13/24 116/67 R |
| 5,890,242 A * | 4/1999 | Minter | A47K 13/06 4/661 |
| 5,894,611 A * | 4/1999 | Toro | A47K 3/001 340/616 |
| 6,772,454 B1 * | 8/2004 | Barry | A47K 11/04 4/661 |
| 6,829,788 B1 * | 12/2004 | Allen | A47K 11/06 4/483 |
| 6,908,392 B2 * | 6/2005 | Friedman | A47K 11/00 273/348 |
| 8,317,517 B2 * | 11/2012 | Giard | G09B 19/0076 434/247 |
| 2008/0271231 A1 * | 11/2008 | Stauber | A47K 13/10 4/246.1 |
| 2009/0284179 A1 * | 11/2009 | Ray | H05B 33/0815 315/306 |
| 2010/0095443 A1 * | 4/2010 | Nishimura | A47K 13/305 4/237 |

(Continued)

FOREIGN PATENT DOCUMENTS

WO    WO 2014071958 A1 *   5/2014    ........... H01R 13/642

*Primary Examiner* — James B Hull
*Assistant Examiner* — Sadaruz Zaman
(74) *Attorney, Agent, or Firm* — NK Patent Law

(57) ABSTRACT

A potty-training system includes a base, a mounting assembly for mounting the base onto a toilet, an arm extending from the base, a target mounted on the arm, a sensor, and multiple light emitters operatively connected to the sensor to cause the emitters to activate in chronologically ordered succession when the target is struck for a duration of time. The light emitters may be spaced along the arm between the target and the base. The multiple light emitters may be activated in chronologically ordered succession by which at least one of the multiple light emitters closest to the target is activated first. A control input device adjusts a rate at which the multiple light emitters are activated in chronologically ordered succession when the target is struck. A sound emitter may also activate when the target is struck.

15 Claims, 5 Drawing Sheets

(56) References Cited

U.S. PATENT DOCUMENTS

| | | | |
|---|---|---|---|
| 2012/0267856 A1 | 10/2012 | Swan et al. | |
| 2013/0084550 A1* | 4/2013 | Mackie | A47K 17/00 434/247 |
| 2013/0086735 A1* | 4/2013 | Oberholzer | E03D 5/105 4/324 |
| 2014/0042962 A1* | 2/2014 | Thompson | H02J 7/0013 320/107 |

* cited by examiner

POTTY-TRAINING SYSTEMS AND METHODS

CROSS-REFERENCE TO RELATED APPLICATION

This application claims the benefit of priority of U.S. provisional patent application No. 62/134,863, titled "potty-training systems and Methods," filed on Mar. 18, 2015, which is incorporated herein in its entirety by this reference.

TECHNICAL FIELD

The present disclosure relates to devices and methods for training and encouraging accuracy when urinating, especially for children. More particularly, the present disclosure relates to targets and devices that respond when struck to encourage consistent aim when potty training boys.

BACKGROUND

Early stages of potty training can be as or more unsanitary than diaper use as children first experience the use of a toilet. Children using diapers are aware of the time of their releases but have no awareness of aim. Thus, toilets can become quite unsightly each time a child undergoing training visits a restroom. Urine, while relatively easy to clean, can be particularly misplaced by poor aim, particularly when boys first learn to stand and relieve themselves at a toilet. Many parents are disinclined to scold their boys over such matters and prefer to focus on the positive aspects of the child at least using the toilet so as not to wet his pants. While parents may sometimes be available to supervise and advise when a boy's aim is on and off target, circumstances arise when a child visits a toilet alone. In any event, positive feedback reinforcement is often preferred when any human training is approached.

Systems and methods for encouraging accurate and consistent aim when urinating are needed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a potty-training system includes: a base; a mounting assembly connected to the base for mounting the base onto a toilet; an arm having a first end extending from the base and a second end; a target mounted on the second end of the arm, the target including a sensor; and a first light emitter operatively connected to the sensor to cause the first light emitter to activate when the target is struck.

In at least one example, a second light emitter is operatively connected to the sensor to cause the second light emitter to activate when the target is struck.

In at least one example, the first light emitter and the second light emitter are activated in chronologically ordered succession when the target is struck.

In at least one example, the first light emitter and the second light emitter are activated in chronologically ordered succession when the target is struck for a duration of time.

In at least one example, the first light emitter and second light emitter are positioned on the arm between the target and the base.

In at least one example, the first light emitter is closer to the target than the second light emitter.

In at least one example, the first light emitter is activated before the second light emitter when the target is struck for a duration of time.

In at least one example, a control input device adjusts a rate at which the first light emitter and the second light emitter are activated in chronologically ordered succession when the target is struck.

In at least one example, a control input device adjusts a sensitivity of the sensor.

In at least one example, a control input device adjusts a sensitivity threshold over which the sensor causes the first light emitter to activate when the target is struck.

In at least one example, the mounting assembly includes a clip for mounting upon a raised toilet seat.

In at least one example, a sound emitter is operatively connected to the sensor to cause the sound emitter to activate when the target is struck.

In at least one example, the target includes a pad that is wider than the target arm.

In at least one embodiment, a potty-training system includes: a base; a mounting assembly connected to the base for mounting the base onto a toilet; an arm having a first end extending from the base and a second end; a target mounted on the second end of the arm; a sensor; and multiple light emitters operatively connected to the sensor to cause the multiple light emitters to activate in chronologically ordered succession when the target is struck.

In at least one example, the multiple light emitters are activated in chronologically ordered succession as the target is struck for a duration of time.

In at least one example, the multiple light emitters are spaced along the arm between the target and the base.

In at least one example, the multiple light emitters are activated in chronologically ordered succession along the arm in a direction from the target toward the base.

In at least one example, the multiple light emitters are activated in chronologically ordered succession by which at least one of the multiple light emitters closest to the target is activated first.

In at least one example, a control input device adjusts a rate at which the multiple light emitters are activated in chronologically ordered succession when the target is struck.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
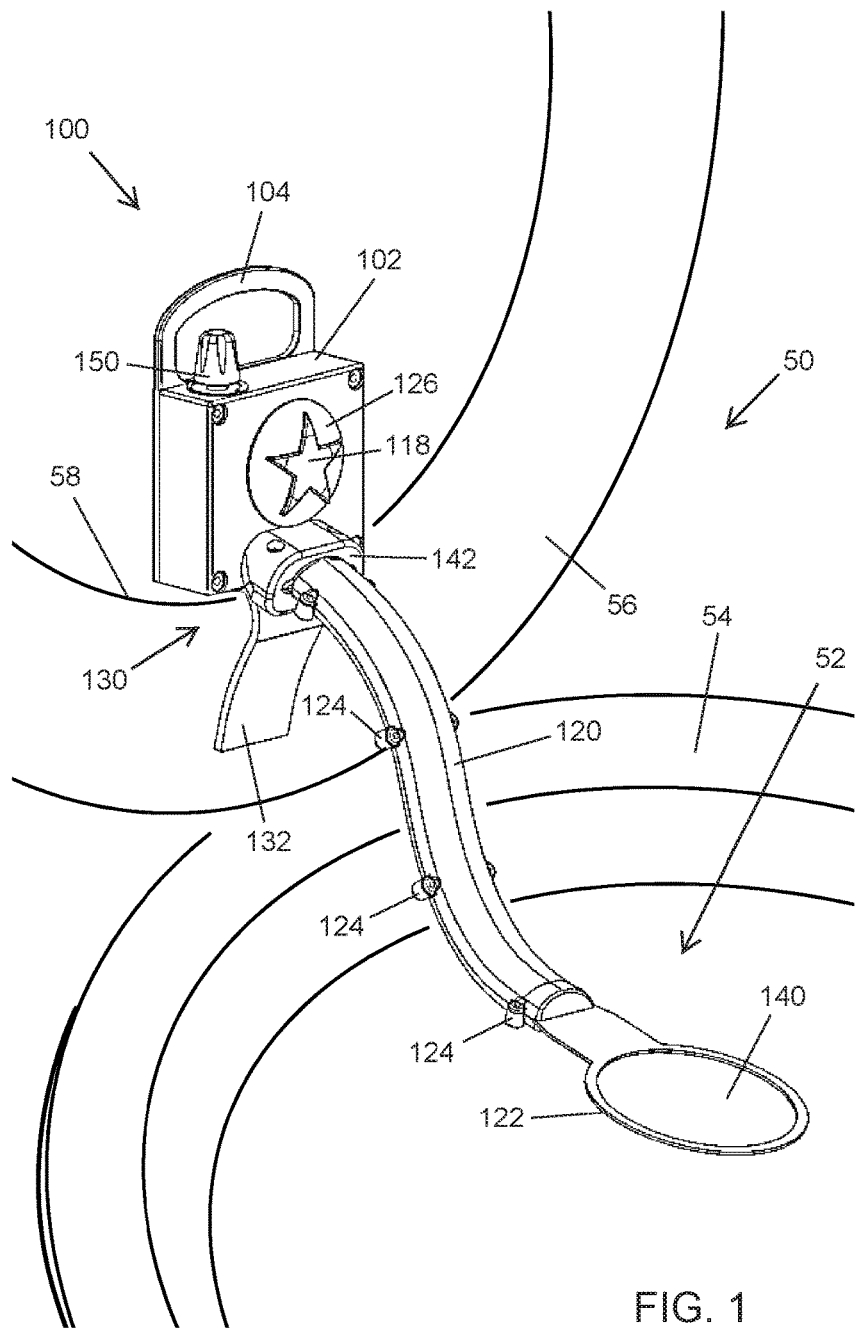
FIG. 1 is a perspective view of a potty-training system, according to at least one embodiment, mounted for use with a toilet.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Figure 2:
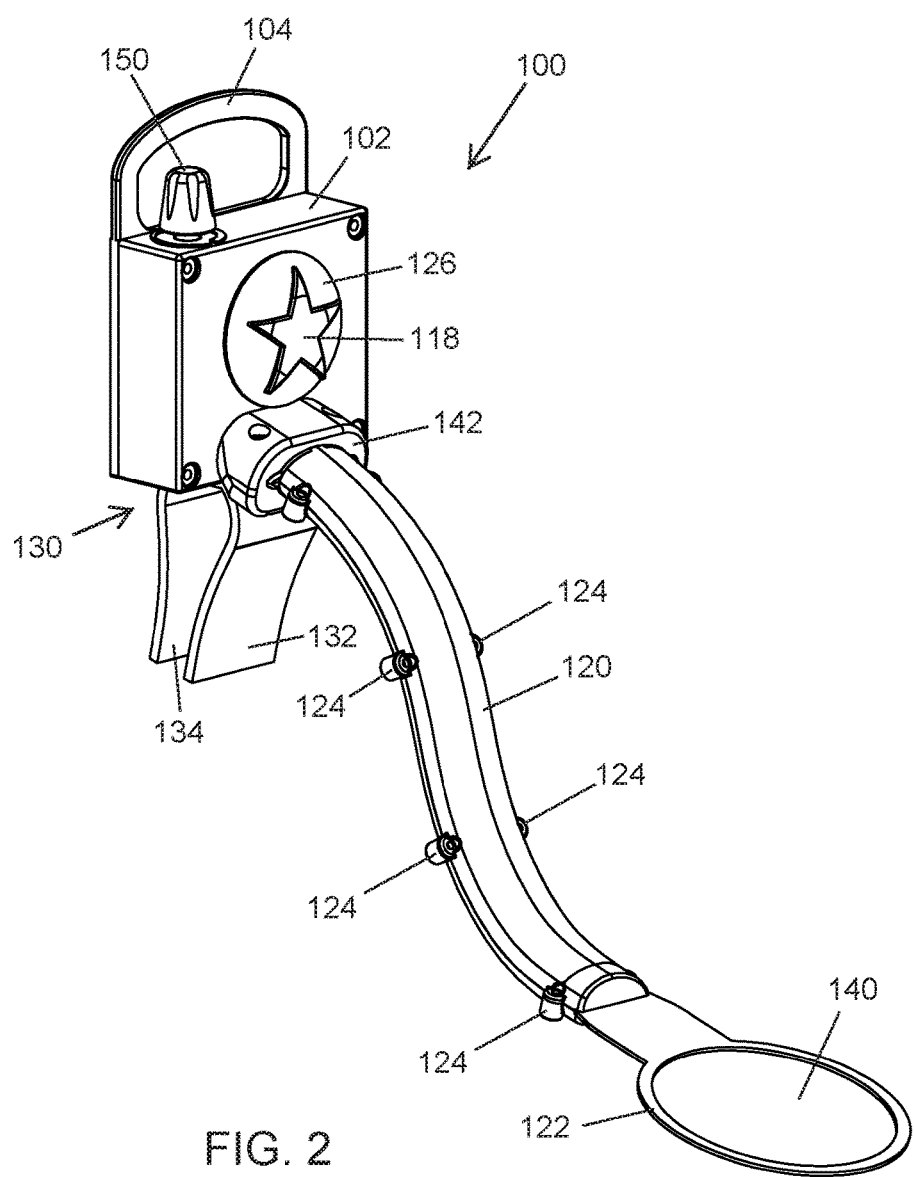
FIG. 2 is a perspective view of the potty-training system of FIG. 1, taken from the same view point, separated from the toilet.

FIG. 1 is a perspective view of a potty-training system 100, according to at least one embodiment, mounted for use with a toilet 50. FIG. 2 is a perspective view of the potty-training system of FIG. 1, taken from the same viewpoint, separated from the toilet 50. The potty-training system 100 includes a base 102 a mounting assembly 130 connected to the base 102, and a target arm 120 extending from the base 102. A handle 104 extends upward from the rear of the base 104 and can be used to grasp and place the potty-training system 100.

The target arm 120 has a first end extending from the base 102, and a second end on which a target 122 is mounted opposite the base 102. When the base 102 is mounted as shown in FIG. 1 in engagement with a toilet by way of the mounting assembly 130 (FIG. 2), the target arm 120 extends forward from the base 102 and downward and into the interior area 52 of the bowl 54 of the toilet 50. The target arm 120 places the target 122 above the water's surface in the approximate center of the interior area 52 of the bowl 54.

Figure 3:
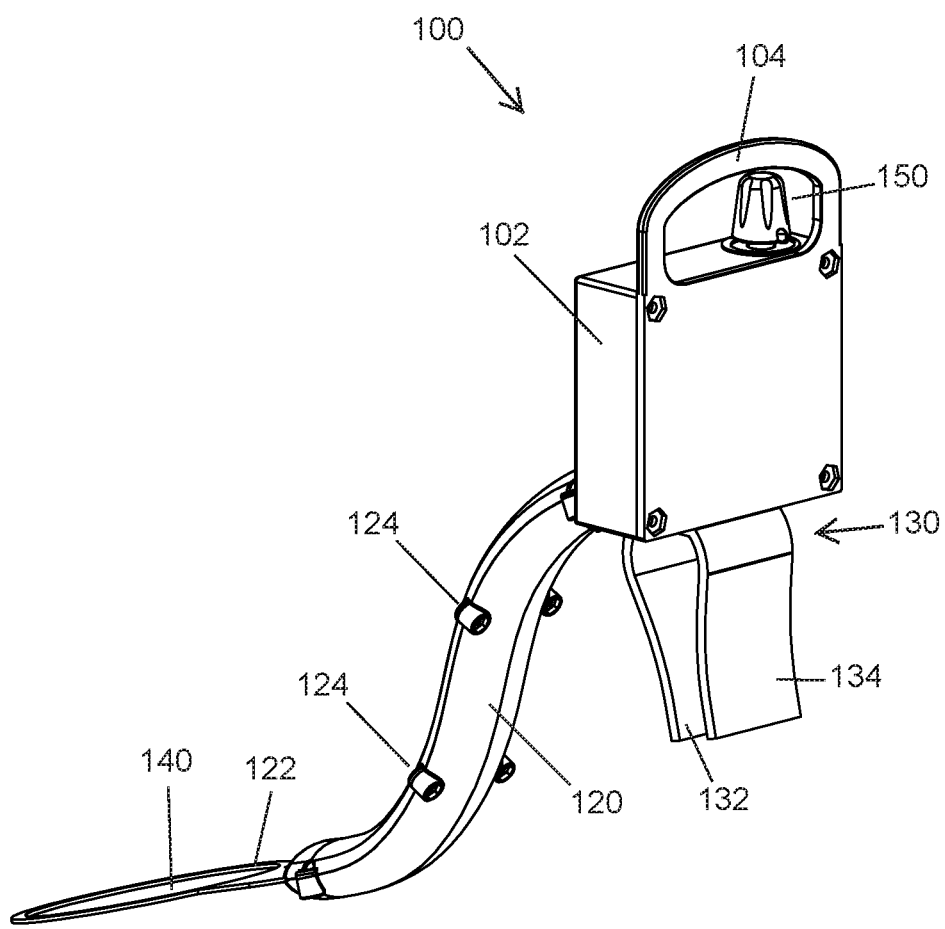
FIG. 3 is a rear perspective view of the potty-training system.
Figure 4:
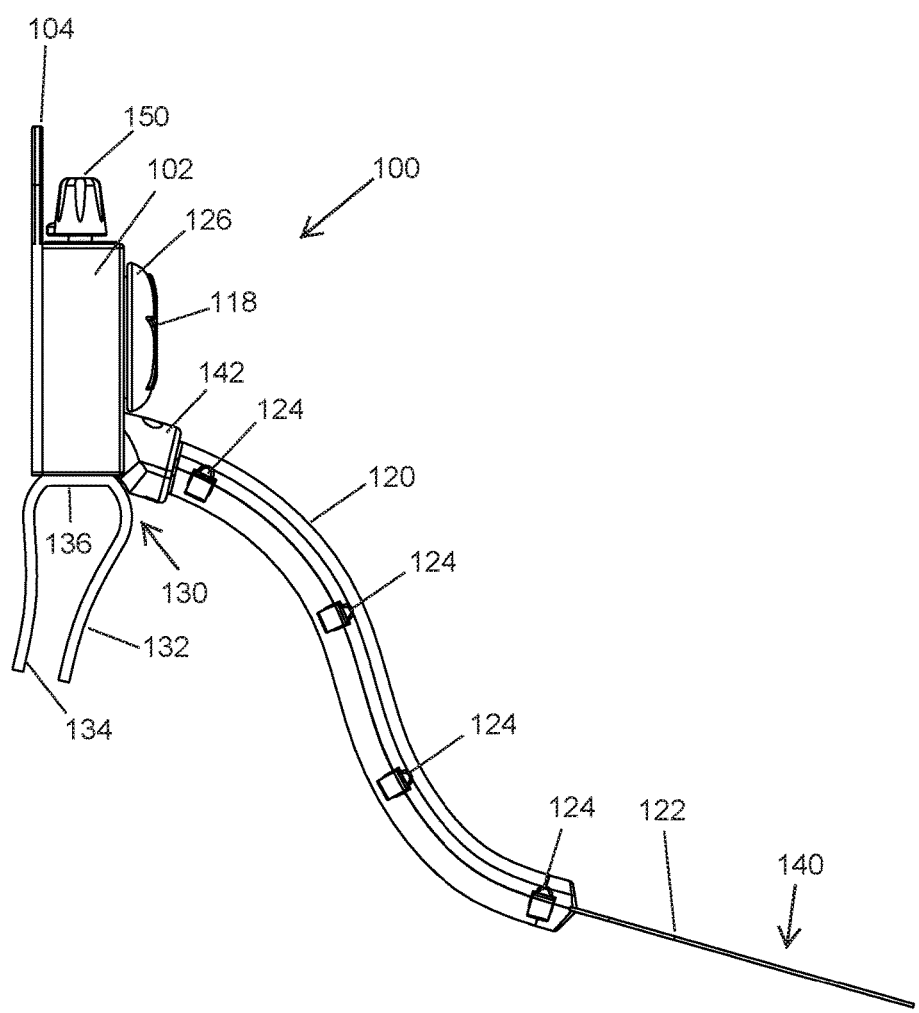
FIG. 4 is a side view of the potty-training system of FIG. 1, showing particularly the mounting assembly.

FIG. 3 is a rear perspective view of the potty-training system 100. FIG. 4 is a side view of the potty-training system 100 of FIG. 1, showing particularly the mounting assembly 130 as having a frontal arm 132 and opposing rear arm 134, each extending from a bridge 136, which is connected to the lower side of the base 102. The arms 132 and 134 extend from the bridge 136 to define a clip for mounting upon a raised toilet seat 56 as shown in FIG. 1. The arms 132 and 134 are resilient so as to retain the inner edge 58 of the raised toilet seat 56 by clamping when the toilet seat is forced between the arms 132 and 134 with slight deformation of the clip defined by the arms 132 and 134 and bridge 136. As shown in FIG. 4, the target arm 120 has a double curve or S-curve configuration to hold the target 122 forward and downward from the base 102.

Figure 5:
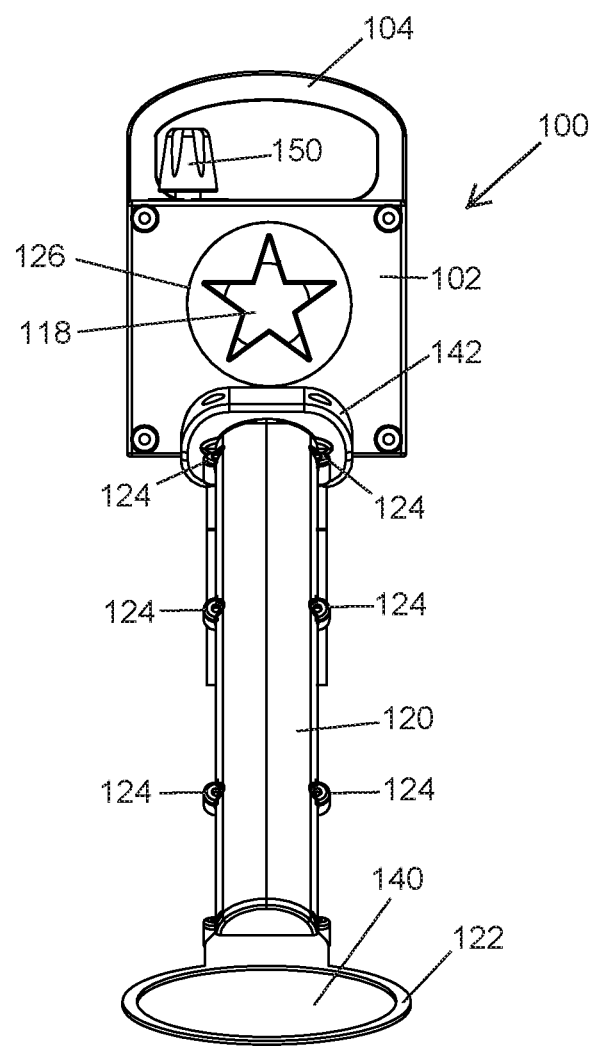
FIG. 5 is a front elevation view of the potty-training system of FIG. 1.

FIG. 5 is a front elevation view of the potty-training system 100 of FIG. 1. The target 122 extends from the terminal end of the target arm 120 opposite the base 102. A series of indicators 124 are spaced along the target arm 120 between the target 122 and base 102. In the illustrated embodiment, the indicators are light-emitting devices, for example LEDs. The potty-training system 100 includes a sensor that causes activation of a response when the target 122 is struck, for example by a stream of urine when in use. The target 122 is shown as a pad that is widened relative to the target arm 120 to convey force, pressure, or vibration when struck.

In at least one embodiment, the indicators 124 are activated in chronologically ordered succession from the target 122 along the target arm 120 toward the base 102 and a goal indicator 118 to encourage consistent aim upon the target 122. For example, the lowest indicators 124 closest the target 122 may light first when the target 122 is struck, and successive indicators may light in turn over time until the highest indicators 124 is lit, followed in one example by lighting of the goal indicator 118 if the target 122 is consistently struck or struck for a duration of time.

If the target 122 is missed, activated indicators deactivate. For example, the indicators 124 may deactivate in a chronologically ordered succession that is the reverse to that by which they activated. That is, the indicators 124 may deactivate from any given activation stage along the target arm 120 sequentially toward the target 122 as no strike occurs over time. This encourages one to redirect a stream onto the target after a brief miss.

An audio report may also be emitted by the potty-training system 100, for example from a sound-emitting device 126 at the base 102 as the target 122 is struck. Audio reports may be emitted, for example, as varying sounds emitted in chronologically ordered succession as the target 122 is struck. Varying sounds may be, for example, sounds varying in volume, varying in tone, or varying in complexity. Escalating sounds may be emitted over time indicating consistent success in striking the target 122. Escalating sounds may be, for example, sounds escalating in volume, escalating in tone, or escalating in complexity.

In one example, escalating sounds of the readying of a rocket for lifting off are emitted, for example a countdown for lift off may be heard. As the highest indicator 124 is lit, the sound of a rocket taking off may be simulated. Similarly, escalating jungle animal sounds may be emitted, for example, in which birds, small animals or running stream waters are first heard, followed by louder sounds such as growls and hoots, and finally as the highest indicator 124 is lit, the sound of a lion's roar, elephants trumpet, or wild man call may be simulated. In yet other examples, the sounds of a ball game narrator is emitted describing that a batter in a baseball game strikes the ball and runs the bases or as a ball carrier in a football game advances as the indicators 124 are lit in succession from the target 120 toward the goal indicator 118. The cheering of a homerun or a touchdown may be simulated in these examples if the target is struck long enough.

In at least one embodiment, the base 102 houses electronic support components and one or more batteries to provide the active responses of the potty-training system 100 such as light and sound. The potty-training system 100 is easily removed from a toilet when not in use by removing the mounting assembly 130 from the toilet seat 56. In another embodiment, some or all of the electronic support components and one or more batteries are housed in the target arm 120.

So as to respond to a flow of liquid upon the target 122, the potty-training system 100 includes a sensor that prompts activation of the potty-training system 100 when the target is struck. In one embodiment, the target 122 includes a vibration or pressure sensor 140 in electrical communication with electronic support components within the base 102 that activate the indicators 124 along the target arm 120 and the goal indicator 118. A sensor 142, in electrical communication with electronic support components within the base 102, may be also or alternatively mounted on the base 110 as shown in FIGS. 1 and 2-5. In such examples, liquid directed upon the target 122 imparts force, pressure and/or vibration, which is sensed at the target, for example by sensor 140, or is conveyed toward the base 102 by the target arm 120 and is sensed at the base, for example by the sensor 142. The sensors 140 and 142 are operatively connected to the indicators 124 such that, when the target 122 is struck, a signal is sent by either or both of the sensors 140 and 142 to activate the indicators 124 along the target arm 120 and the goal indicator 118 and sound-emitting device 126.

In other embodiments, various other sensors of various types, each in electrical communication with electronic support components within the base 102, may be mounted within or upon the target 122, target arm 120, and base 102. In at least one example, the sensor 140 includes two electrical contacts or probes through which a circuit is made by urine when the target is struck. In that example, hydrophobic material may be sprayed or otherwise applied to, for example, the sensor 140 to reduce any occurrence of liquid drops maintaining current and falsely triggering activation after urine flow has subsided.

In the illustrated embodiment, a control input device 150, shown for example as rotary knob, is mounted on the base 102 for access by a user. The control input device 150 may switch the potty-training system 100 into on and off states, for example so as to preserve battery power when not in use. The control input device 150 may be used to adjust a sensitivity threshold over which the sensor 140 and/or sensor 142 activate the potty-training system 100 when the target 120 is struck. The control input device 150 may be used to adjust the rate at which the indicators 124 are activated in chronologically ordered succession from the target 122 along the target arm 120 toward a goal indicator 118. For example, a high rate corresponding to relatively short delay times between adjacent indicators 124 may be selected for early training in which even intermittent strikes upon the target 120 are to be rewarded, whereas a low rate corresponding to relatively high delay times between adjacent indicators 124 may be selected for advanced training in which more consistent targeting is to be rewarded.

Though shown for example as a single rotary knob, control input device 150 can include any number or arrangement of user input switches or elements. In at least one example, the control input device 150 includes a membrane covered switch to prevent moisture from entering the base 102.

Although the mounting assembly 130 expressly shown in the drawings is illustrated as a clip for mounting upon the inner edge of a raised toilet seat, other mounting assemblies are within the scope of these descriptions. In at least one example, a mounting assembly includes a strap that wraps around and engages the toilet lid. In another example, a mounting assembly includes a suction cup, for example on the back of the base 102. The mounting assembly may include a strap, clip, arm or surface engaging element configured to engage a toilet seat, lid, or bowl.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A potty-training system comprising:
   a base;
   a mounting assembly connected to the base for mounting the base onto a toilet;
   an arm having a first end extending from the base and a second end;
   a target mounted on the second end of the arm, the target including a sensor;
   a first light emitter operatively connected to the sensor; and
   a second light emitter operatively connected to the sensor,
   wherein the first light emitter and the second light emitter are activated in chronologically ordered succession when the target is struck for a duration of time, and
   wherein, when the target is missed after being struck for the duration of time, the first light emitter and second light emitter deactivate in an order that is reverse to the chronologically ordered succession in which they are activated.

2. The potty-training system of claim 1, wherein the first light emitter and second light emitter are positioned on the arm between the target and the base.

3. The potty-training system of claim 2, the first light emitter is closer to the target than the second light emitter.

4. The potty-training system of claim 3, wherein the first light emitter is activated before the second light emitter when the target is struck for the duration of time.

5. The potty-training system of claim 1, further comprising a control input device that adjusts a rate at which the first light emitter and the second light emitter are activated in chronologically ordered succession when the target is struck for the duration of time.

6. The potty-training system of claim 1, further comprising a control input device that adjusts a sensitivity of the sensor.

7. The potty-training system of claim 1, further comprising a control input device that adjusts a sensitivity threshold over which the sensor causes the first light emitter to activate when the target is struck.

8. The potty-training system of claim 1, wherein the mounting assembly comprises a clip for mounting upon a raised toilet seat.

9. The potty-training system of claim 1, further comprising a sound emitter operatively connected to the sensor to cause the sound emitter to activate when the target is struck.

10. The potty-training system of claim 1, wherein the target comprises a pad that is wider than the target arm.

11. A potty-training system comprising:
    a base;
    a mounting assembly connected to the base for mounting the base onto a toilet;
    an arm having a first end extending from the base and a second end;
    a target mounted on the second end of the arm;
    a sensor; and
    multiple light emitters operatively connected to the sensor to cause the multiple light emitters to activate in chronologically ordered succession when the target is struck for a duration of time,
    wherein, when the target is missed after being struck for the duration of time, the multiple light emitters deactivate in an order that is reverse to the chronologically ordered succession in which they are activated.

12. The potty-training system of claim 11, wherein the multiple light emitters are spaced along the arm between the target and the base.

13. The potty-training system of claim 12, wherein the multiple light emitters are activated in chronologically ordered succession along the arm in a direction from the target toward the base.

14. The potty-training system of claim 11, wherein the multiple light emitters are activated in chronologically ordered succession by which at least one of the multiple light emitters closest to the target is activated first.

15. The potty-training system of claim 11, further comprising a control input device that adjusts a rate at which the multiple light emitters are activated in chronologically ordered succession when the target is struck.

* * * * *